Figure 1:
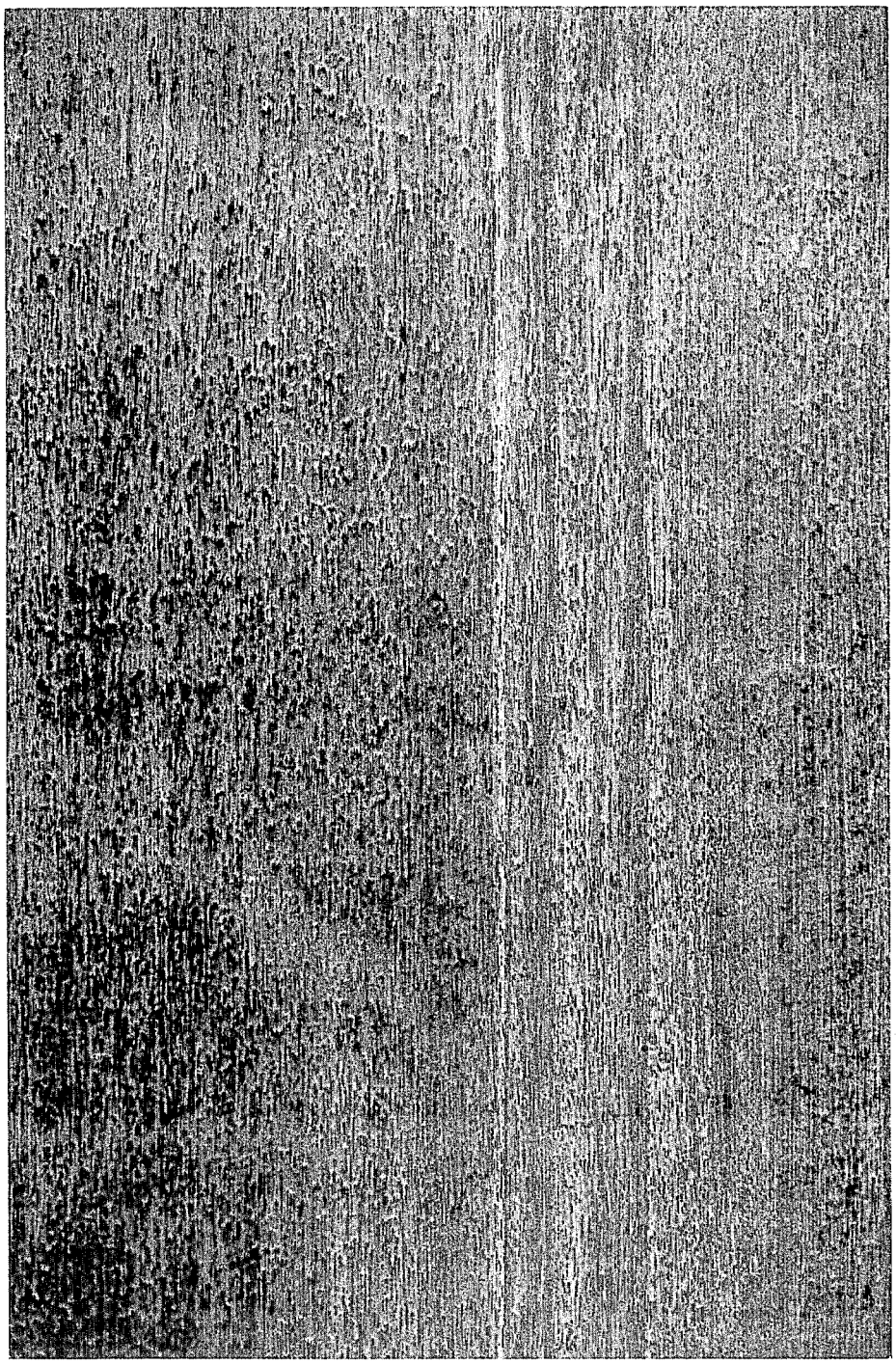

United States Patent [19]

Martinelli et al.

[11] 4,409,276
[45] Oct. 11, 1983

[54] METAL ARTICLE HAVING THREE-DIMENSIONAL WOOD GRAIN AND STAINABLE COATING

[75] Inventors: Lawrence R. Martinelli, Arlington Heights; Geronimo E. Lat, Skokie, both of Ill.

[73] Assignee: United States Gypsum Company, Chicago, Ill.

[21] Appl. No.: 338,771

[22] Filed: Jan. 11, 1982

[51] Int. Cl.³ .............................................. B32B 3/00
[52] U.S. Cl. .................................. 428/142; 428/151; 428/163; 428/164; 428/167; 428/168; 428/174; 428/457
[58] Field of Search ............... 428/142, 167, 151, 168, 428/163, 164, 457, 174

[56] References Cited

U.S. PATENT DOCUMENTS

| | | | |
|---|---|---|---|
| 1,651,136 | 11/1927 | Lang | 428/151 X |
| 2,248,254 | 7/1941 | Small | 428/151 X |
| 3,247,047 | 4/1966 | Buckley | 428/167 |
| 3,692,557 | 3/1969 | Sormani | 117/41 |
| 3,776,752 | 12/1973 | Craven | 427/273 |
| 3,811,915 | 5/1974 | Burrell et al. | 117/45 |
| 3,847,646 | 11/1974 | Daunheimer et al. | 117/37 R |
| 4,022,943 | 5/1977 | Erb et al. | 428/164 |
| 4,175,066 | 11/1979 | Shibazaki et al. | 260/29.6 M |
| 4,210,695 | 7/1980 | Hirono et al. | 428/151 |

FOREIGN PATENT DOCUMENTS 54-58786  5/1979  Japan ................................ 428/167

OTHER PUBLICATIONS

Kovaly, Handbook of Plastic Furniture Manufacturing, Techonomic Publishing Company, 9/73, pp. 76-78.

Primary Examiner—George F. Lesmes
Assistant Examiner—E. Rollins Buffalow
Attorney, Agent, or Firm—Roert M. Didrick; Samuel Kurlandsky; Robert H. Robinson

[57] ABSTRACT

A metal article is made to look like wood by impressing a three-dimensional wood grain pattern in its surface, coating the pattern with a translucent film, and staining the film. The stainable film is an acrylic resin filled with an extender pigment whose mean particle size is from about 5 to about 7 microns.

12 Claims, 1 Drawing Figure

METAL ARTICLE HAVING THREE-DIMENSIONAL WOOD GRAIN AND STAINABLE COATING

This invention relates to metal articles having an integral, three-dimensional, simulated wood grain in its surface. It further relates to such an article having a stain-absorbent coating on its surface.

Various techniques have been used over the years to simulate wood grain on metal panels. Among these is the lamination on such a panel of a vinyl film having a wood grain pattern printed thereon. The film is subject to delamination and permanent disfigurement by tearing or scuffing actions. Another technique is the printing of the wood grain pattern directly on the metal. The printed pattern is very susceptible to scratching and scuffing. Restoration to the original state is exceedingly difficult. A technique requiring artistic ability is the manual staining of a metal panel to give a streaked appearance resembling a wood grain.

Furthermore, as the patentees in U.S. Pat. No. 3,811,915 observe, such simulated wood grains have the disadvantage of looking and feeling flat as compared to the three-dimensional look and feel of most natural woods. In said patent, there is taught a method for similating a three-dimensional wood grain without the need for recourse to techniques such as mechanical embossing. The method taught comprises applying a conventional background-forming groundcoat to a substrate, printing a wood grain on the dried groundcoat with a graining ink containing a silicone fluid, and covering the printed groundcoat with a conventional top coat. The patentees teach that the ground coat is normally pigmented to provide the desired contrast with the graining ink.

Other wood graining techniques are taught in U.S. Pat. Nos. 1,651,136; 2,248,254; and 3,847,646. In each, a pigmented ground color coat forms an opaque film over which a stain is applied.

In U.S. Pat. No. 3,692,557, a method for producing a "crackled" antique finish utilizes a composition comprising an acrylic resin emulsion, finely ground marble, polyurethane and water. The composition may be applied as both the first and third coatings on a substrate, the second coating being a water soluble dye, or, in the case where the substrate is non-absorbent, the water soluble dye is applied first and the acrylic/polyurethane emulsion is applied over the dried dye. In either case, the water soluble dye is said to "bleed through" upwards into the third or uppermost coating to form a crackled, antique finish.

In many instances, pigments which provide color and opacity to a groundcoat also have the effect of sealing the film so that a stain is not absorbed or, at best, it is absorbed unevenly.

Now, it has been discovered that a realistic, three-dimensional wood grain may be simulated in the surface of a metal article by forming a multitude of grooves in said surface, said grooves being of random lengths and depths and spaced apart differentially to form thread-like ridges and plateaus on said surface; applying a translucent coating to said surface; and applying a decorative stain over said translucent coating.

It is an object of this invention, therefore, to provide a metal article having the visual and physical appearance of wood.

It is a related object of this invention to provide a metal article having a three-dimensional, simulated wood grain in its surface which cannot be marred or scratched off without a considerable amount of abuse.

It is a further object of this invention to provide enhanced realism to a three-dimenional, simulated wood grain by coating the simulated wood grain surface with a translucent film which absorbs a decorative stain evenly, and staining the coated surface.

It is a further object of this invention to provide a method for the high volume production of a metal article having a three-dimensional, stainable simulated wood grain in its surface.

These and other objects which will become apparent are achieved by a metal article having an integral, three-dimensional, simulated wood grain in its surface and a stainable translucent coating over said simulated wood grain, and a method for making said coated article.

FIG. 1 is a photograph of a stained metal panel illustrative of this invention.

The metal article is preferably made of steel but other metals such as aluminum, copper, tin, and inherently colored alloys such as brass and bronze are also contemplated as the substrate in this invention. The article may be simply sheet metal or it may be a shaped article made by bending sheet metal or by molding the metal. Steel doors for houses and other buildings, i.e., architectural doors; door jambs, cabinetry and decorative trim exemplify articles for which the advantages of this invention are often sought.

The three-dimensional simulation of wood grain in the metal surface may be accomplished, for example, by embossing, coining, or etching the metal to form the grooves and the consequent thread-like ridges or tics and plateaus. The grooves and, therefore, the tics and plateaus are of random length and width. The depth of the grooves is also not uniform. Although the tics are for the most part parallel, they and the plateaus appear to converge and diverge because of the varying lengths and widths of the grooves. Before being coated, the minimum depth of the grooves is about 2.2 times the thickness of the dry film which is to be deposited from the coating composition. A particularly pleasing and realistic effect is achieved by a preferred arrangement of the tics so that there are from about 80 to about 85 tics per square inch (about 12–13 per square centimeter). The average width of the tics in such arrangement is about 16 mils (about 0.4 mm) and the average depth of the grooves is about 5 mils (about 0.13 mm).

The bare metal surface is, of course, only suggestive of a wood grain. It is the translucent coating which enables one to complete the effect by rubbing and wiping a selected stain over the pattern. The translucent coating is substantially colorless and is capable of absorbing a decorative stain while still exposing the color and markings of the substract. When, as is usually the case, the color of the metal is not a desirable base for the simulation of wood grain, a pigmented primer is applied to the metal before the stainable coating is applied. In some instances, however, the color of the metal, e.g., copper, bronze and the like, may serve well for special effects.

The slightly opaque, translucent coating is a filled acrylic resin film formed from an aqueous composition comprising an acrylic latex and, as the filler, a water-insoluble extender pigment having a mean particle size of from about 5 to about 7 microns, and then drying the coating by a suitable method to form the film.

The acrylic latices used in making the stainable coating composition are aqueous emulsions containing from about 30% to about 45% of an acrylic resin by weight. Homopolymers and copolymers of alkyl acrylates and methacrylates and copolymers of such monomers with acrylonitrile, acrylic and methacrylic acids, styrene and similar vinyl monomers are examples of acrylic resins which are useful as the film forming constituents of the translucent coating. The term "alkyl" is used herein to mean an alkyl group having from 1 to 8 carbon atoms. Acrylates and methacrylates in which the alkyl group contains from 1 to 3 carbon atoms are preferred. Copolymers of such esters with each other and/or with one or more of the monomers specifically mentioned above are particularly preferred.

The aqueous coating composition generally comprises from about 10% to about 15% of the acrylic resin by weight. Water usually constitutes from about 10% to about 40% of the weight of the composition, including water in the acrylic latex and added water.

The size of the extender pigment particles is critical. Although the mean particle size may be from about 5 to about 7 microns, it is preferred that it be no greater than about 6 microns. A maximum particle size of about 25 microns is also preferable. It is also important that the extender pigment be a soft material, i.e., one having a hardness on the Moh scale of about 4 or less. Such materials are exemplified by calcium carbonate, zinc phosphate and barium sulfate. Particularly useful are zinc phosphate having an average particle size of about 6 microns and calcium carbonate having a mean particle size of about 5.5 microns.

From about 15% to about 50%, preferably from about 25% and up, of the weight of the aqueous coating composition is extender pigment. The weight ratio of the filler, i.e., extender pigment, to acrylic resin in the aqueous composition and, therefore, in the film is from about 1.5:1 to about 3.6:1, preferably from about 2.5:1 to 3.6:1.

The viscosity of the aqueous coating composition containing such large amounts of extender pigment is reduced by the addition of from about 0.25% to about 0.75% of a titanate coupling agent, based on the weight of the extender pigment. A preferred amount of coupling agent is from about 0.3% to about 0.5%. The titanate coupling agent is exemplified by isopropyl triisostearyl titanate, titanium di-(dioctylpyrophosphate) oxyacetate, di-(dioctylpyrophosphato) ethylene titanate, and the quaternary ammonium salts of those titanate coupling agents which have an acidic function. The quaternary ammonium salts are particularly useful in the aqueous coating composition and are preferred. Especially preferred are the salts of 2-dimethylaminomethyl propanol with either the oxyacetate or the ethylene titanate mentioned above. The titanate coupling agents are described more fully in U.S. Pat. Nos. 4,069,192; 4,080,353; 4,087,402; 4,094,853; 4,098,758; and 4,122,062, all of which are incorporated herein for that purpose.

The aqueous coating composition may also contain water soluble solvents such as ethylene glycol, propylene glycol, isopropanol, butyl cellosolve, and the like. Such solvents and mixtures thereof are added to improve sprayability of the coating composition and to regulate the drying time during film formation. The amounts used will depend on the nature and amounts of other components and on the desired drying time but such solvents usually constitute from about 5% to about 10% of the total weight of the coating composition. Solvent mixtures are especially useful and are preferred.

The viscosity of the aqueous coating composition may be adjusted by the addition of a thickener such as the methylcellulose ethers and carboxymethylcellulose. Cross-linked acrylic or methacrylic acid copolymer emulsions also function as thickeners when activated by a base such as ammonium hydroxide. From about 0.1% to about 0.5% by weight of the aqueous composition is a generally sufficient amount of thickener.

The stainable, translucent film is formed on the wood grained surface of the metal by spraying, roller-coating, or applying the aqueous composition by any other suitable method and then drying the composition. The drying temperature may range from just above the freezing point of the composition to just below its decomposition temperature but it is preferably from about room temperature to about 350° F. (about 177° C.). At the particularly preferred temperature of about 160° F. (about 70° C.), the film is sufficiently dry after about 10 to 15 minutes; the drying time will be correspondingly longer at lower temperatures and shorter at higher temperatures. The film is usually from about 0.5 to about 1 mil thick after drying but it may be thicker if desired.

The film accepts a decorative stain evenly much like wood does. Staining of the film may be accomplished without runs even when the surface of the substrate is vertical. Water-based, alkyd, and oil-based stains are readily absorbed.

The invention is illustrated more specifically by the following example wherein all parts are by weight.

EXAMPLE 1

Sheet steel is embossed to achieve a pattern of generally parallel lines or tics of random length to simulate the pattern of a wood grain. The wood grain effect is obtained by an arrangement of individual tics spaced apart differentially so that there are about 80 to 85 tics per square inch. The average width of a tic is about 16 mils and the average depth of the grooves between the tics is about 5 mils.

A residential steel door is fabricated from the embossed sheet material and the surface intended to be the exterior face is primed with a pigmented base coat having a beige color.

An acrylic latex coating composition is prepared by mixing 12,980 parts of water, 116.2 parts of the quaternary ammonium salt of 2-dimethylamino-methyl propanol and di(dioctylpyrophosphato) ethylene titanate, and 23,925 parts of calcium carbonate having a mean particle size of 5.5 microns for 10 minutes in a high speed mixer. Then are added 19,140 parts of an acrylic/styrene copolymer latex sold by Polyvinyl Chemical Industries under the trademark Neocryl A-623 and which has a resin content of about 35% and a Brookfield viscosity at 25° C. of 320 cps. An anti-foaming agent (68.3 parts) comprising a non-ionic surfactant and a silicone (sold under the trademark Nopco NXZ), 136.5 parts of a non-ionic surfactant (Tamol 165), 1503 parts of butyl cellosolve, 68.3 parts of concentrated ammonium hydroxide (28% $NH_3$), 34.1 parts of 2-amino-2-methyl-1-propanol, 136.1 parts of a cellulosic thickener, 1777 parts of ethylene glycol, 15 parts of a bactericide, and an additional 8203 parts of water are added and the mixture is thoroughly blended at room temperature.

The resulting aqueous coating composition is sprayed onto the embossed face of the steel door and dried at 160° F. (about 70° C.) to a translucent, colorless film.

The thus coated face of the door is then stained with a semi-transparent oil-based stain (Olympic) by the conventional spreading and wiping technique. An excellent wood-like appearance is achieved upon drying of the stain.

In contrast to the results in Example 1, the presence of a pigment at a low level of concentration in an aqueous coating composition otherwise corresponding to that of Example 1 caused a pronounced mottled effect on sheet steel having the simulated wood grain embossed thereon. Use of a pigment at a concentration high enough to obscure the mottling resulted in a coating which would not absorb a stain satisfactorily.

A clear protective top coat may be applied over the stain. The top coating composition may be water-based or oil-based.

To those skilled in the art to which this invention relates, many changes which do not depart from the spirit and scope of this invention may suggest themselves. The foregoing description is purely illustrative and not restrictive of that spirit and scope.

What is claimed is:

1. A metal article having an integral, three-dimensional, simulated wood grain in its surface provided by forming a multitude of grooves in said surface, and applying a stainable, substantially colorless, translucent coating over said simulated wood grain, said coating comprising an acrylic resin and an extender pigment having an average particle size of about 5 to about 7 microns and a hardness on the Moh scale of no more than about 4, the ratio of extender pigment to resin is from about 1.5:1 to about 3.6:1 by weight.

2. The metal article of claim 1 characterized further in that said translucent coating carries an absorbed stain.

3. The metal article of claim 1 wherein the extender pigment is calcium carbonate.

4. The metal article of claim 1 wherein the extender pigment is zinc phosphate.

5. The metal article of claim 1 wherein the acrylic resin is a styrene/acylic copolymer.

6. The metal article of claim 1 wherein the film is deposited from a latex emulsion comprising said resin and said extender pigment.

7. The metal article of claim 1 wherein said translucent pigmented coating carries an absorbed stain.

8. The metal article of claim 7 having a pigmented primer coat under said translucent coating.

9. The metal article of claim 7 wherein said stain is an oil-based stain.

10. The metal article of claim 7 wherein said stain is a water-based stain.

11. The metal article of claim 1 or claim 2 wherein said metal is steel.

12. A steel architectural door characterized by at least one face having an embossed surface simulating a wood grain and said surface having a stainable, substantially colorless, translucent coating thereon.

* * * * *